(12) United States Patent
Kapany

(10) Patent No.: US 6,356,679 B1
(45) Date of Patent: Mar. 12, 2002

(54) OPTICAL ROUTING ELEMENT FOR USE IN FIBER OPTIC SYSTEMS

(75) Inventor: Narinder S. Kapany, Woodside, CA (US)

(73) Assignee: K2 Optronics, Inc., Sunnyvale, CA (US)

( * ) Notice: Subject to any disclaimer, the term of this patent is extended or adjusted under 35 U.S.C. 154(b) by 0 days.

(21) Appl. No.: 09/539,485

(22) Filed: Mar. 30, 2000

(51) Int. Cl.$^7$ .................................................. G02B 6/35
(52) U.S. Cl. ............................. 385/18; 385/17; 385/48
(58) Field of Search .......................... 385/16–18, 20–22

(56) References Cited

U.S. PATENT DOCUMENTS

| | | | |
|---|---|---|---|
| 4,478,494 A | 10/1984 | Soref | 350/381 |
| 4,580,873 A | 4/1986 | Levinson | 350/96.2 |
| 4,630,883 A | 12/1986 | Taylor et al. | 350/96.15 |
| 4,674,828 A | 6/1987 | Takahashi et al. | 350/96.3 |
| 4,681,397 A | 7/1987 | Bhatt | 350/96.2 |
| 4,714,326 A | 12/1987 | Usui et al. | 350/485 |
| 4,846,542 A | 7/1989 | Okayama et al. | 350/96.15 |
| 5,221,987 A | 6/1993 | Laughlin | 354/222 |
| 5,255,332 A | 10/1993 | Welch et al. | 385/17 |
| 5,283,844 A | 2/1994 | Rice et al. | 385/17 |
| 5,581,643 A | 12/1996 | Wu | 385/17 |
| 5,699,462 A | 12/1997 | Fouquet et al. | 385/18 |
| 5,960,131 A | 9/1999 | Fouquet et al. | 385/17 |
| 5,999,307 A | 12/1999 | Whitehead et al. | 359/298 |
| 6,022,671 A | 2/2000 | Binkley et al. | 430/321 |
| 6,154,586 A | * 11/2000 | MacDonald et al. | 385/18 |

FOREIGN PATENT DOCUMENTS

| | | | |
|---|---|---|---|
| EP | 0310184 A1 | 9/1988 | |
| EP | 0907091 A2 | 9/1988 | G02B/6/293 |
| JP | 63-197923 | 8/1988 | |
| JP | 2-179621 | 7/1990 | |
| JP | 6-175052 | 6/1994 | |

* cited by examiner

Primary Examiner—John D. Lee
Assistant Examiner—Sarah N Song
(74) Attorney, Agent, or Firm—Townsend and Townsend and Crew LLP

(57) ABSTRACT

An optical routing element (ORE) that can be incorporated into a variety of configurations, to provide the basis for such devices as crossbar switches, wavelength division multiplexers, and add/drop multiplexers. The ORE includes first, second, and third waveguide segments. The first and second waveguide segments extend along a common axis, and are separated by a routing region. The third waveguide segment extends from the routing region at a non-zero angle with respect to the common axis. The routing region is occupied by a selectively reflecting element that selectively reflects light based on a state of the element or a property of the light. The selectively reflecting element may be a thermal expansion element (TEE) or a wavelength-selective filter. A TEE has a body of material having contracted and expanded states at respective first and second temperatures. The contracted state defines an air gap disposed in the path of light traveling along the first waveguide segment so as to cause the light to be deflected into the third waveguide segment through total internal reflection. The expanded state removes the air gap so as to allow the light traveling along the first waveguide segment to pass into the second waveguide segment. The first, second, and third waveguide segments are formed in a monolithic planar waveguide device, and a trench is formed across the region where the waveguide segments intersect. The selectively reflecting element is disposed in the trench. Communication with the ORE is typically effected through optical fibers that are in optical contact with the waveguide segments at respective positions at the edges of the planar waveguide device. The optical fibers may have flared cores.

19 Claims, 5 Drawing Sheets

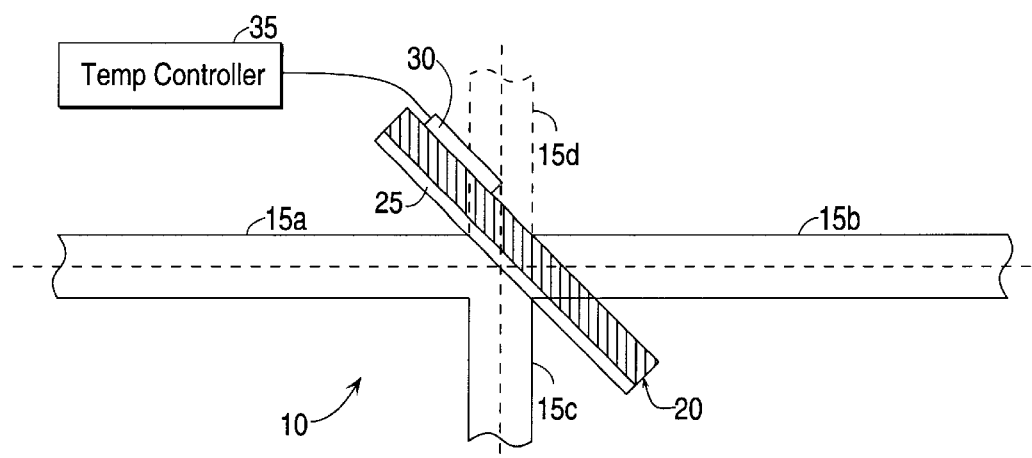
FIG. 1
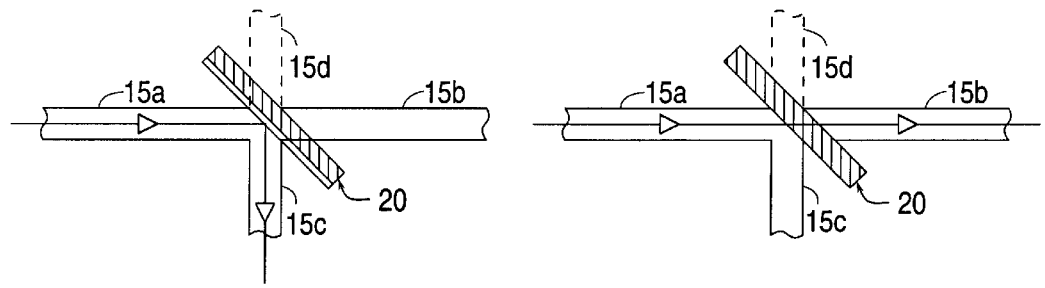
FIG. 2A              FIG. 2B
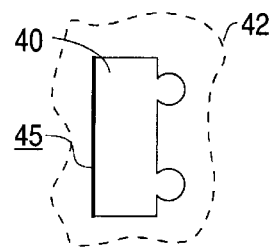   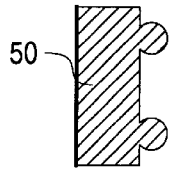   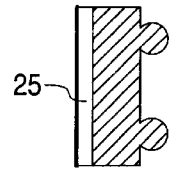
FIG. 3A              FIG. 3B              FIG. 3C
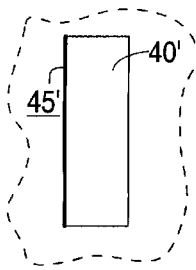   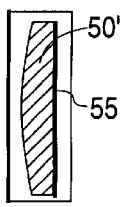   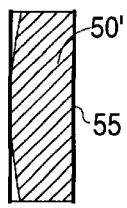   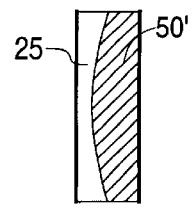
FIG. 4A         FIG. 4B         FIG. 4C         FIG. 4D

OPTICAL ROUTING ELEMENT FOR USE IN FIBER OPTIC SYSTEMS

OPTICAL ROUTING ELEMENT FOR USE IN FIBER OPTIC SYSTEMS

BACKGROUND OF THE INVENTION

This application relates generally to fiber optics and more specifically to fiber optic routing devices.

For high bandwidth fiber optics communication systems, an important functional requirement is the ability to switch optical signals with low loss and low crosstalk. That is, an effective optical switch should switch a significant fraction of the light to the intended channel and substantially none of the light to unintended channels. Crosstalk is typically expressed in terms of attenuation (measured in decibels or dB), and −50 dB is generally considered a target performance level. A crossbar switch is a matrix of switching elements for switching optical signals from a set of signal-carrying input optical fibers to a set of output optical fibers. In addition to the functional performance characteristics mentioned above, it is desirable that the switch be fast, reliable, compact, and inexpensive.

Prior art optical switches include (1) opto-mechanical devices (using moving micro-optics), (b) thermo-optical polymer waveguides, (c) micro-electromechanical (MEMS), and (d) index matching fluid with movable bubbles in trenches in a planar waveguide. While all of these technologies have been demonstrated for optical switches, considerable efforts are still ongoing to develop an all optical crossbar switch characterized by low loss and crosstalk, high speed and reliability, small overall size, and low cost.

An additional important functionality is to provide add/drop wavelength multiplexing. An add/drop multiplexer will extract one or more wavelength channels from a multi-wavelength optical communications link and inject one or more wavelength channels carrying different information. As is well known, typical single-mode, fiber optics communications are at wavelengths in the 1300-nm and 1550-nm ranges. The International Telecommunications Union (ITU) has defined a standard wavelength grid having a frequency band centered at 193,100 GHz, and other bands spaced at 100 GHz intervals around 193,100 GHz. This corresponds to a wavelength spacing of approximately 0.8 nm around a center wavelength of approximately 1550 nm, it being understood that the grid is uniform in frequency and only approximately uniform in wavelength.

SUMMARY OF THE INVENTION

The present invention provides an optical routing element (ORE) characterized by low insertion loss, low crosstalk, ease of manufacture, and low cost.

The ORE includes first, second, and third waveguide segments. The first and second waveguide segments extend along a common axis, and are separated by a routing region. The third waveguide segment extends from the routing region at a non-zero angle with respect to the common axis. In some embodiments, the routing region is occupied by a selectively reflecting element. The selectively reflective element selectively reflects light based on a state of the element or a property of the light.

In some switch embodiments, the selectively reflecting element is a thermal expansion element (TEE) that includes a body of material (such as a polymer material) having contracted and expanded states at respective first and second temperatures. The contracted state defines an air gap disposed in the path of light traveling along the first waveguide segment so as to cause the light to be deflected into the third waveguide segment through total internal reflection. The expanded state removes the air gap so as to allow the light traveling along the first waveguide segment to pass into the second waveguide segment.

In a preferred construction, the first, second, and third waveguide segments are formed in a monolithic planar waveguide device, and a trench is formed across the region where the waveguide segments intersect. A selectively reflecting element, such as a TEE, is disposed in the trench. Communication with the ORE is typically effected through optical fibers that are in optical contact with the waveguide segments at respective positions at the edges of the planar waveguide device.

In some embodiments, the optical fibers have flared cores. That is, the cores gradually expand so that they have a larger diameter where they contact the planar waveguide device. This allows the transverse dimensions of the waveguide segments to be larger, which eases the manufacture and allows more flexibility in the design of the selectively reflecting element. The transition to the larger diameter is sufficiently gradual that single-mode propagation in the fiber is maintained.

In some embodiments, the selectively reflecting element is a wavelength selective filter. OREs according to different embodiments of the invention are readily incorporated into a variety of configurations, to provide the basis for such devices as crossbar switches, wavelength division multiplexers, and add/drop multiplexers.

A further understanding of the nature and advantages of the present invention may be realized by reference to the remaining portions of the specification and the drawings.

BRIEF DESCRIPTION OF THE DRAWINGS

FIG. 1 is a schematic plan view of an optical routing element (ORE) where the selectively reflecting element is a thermal expansion element (TEE) that provides selective total internal reflection;

FIGS. 2A and 2B are schematic views showing the operation of the ORE;

FIGS. 3A–3C are schematic views showing a first technique for fabricating the TEE;

FIGS. 4A–4D are schematic views showing a second technique for fabricating the TEE;

DESCRIPTION OF THE SPECIFIC EMBODIMENTS

Figure 5:
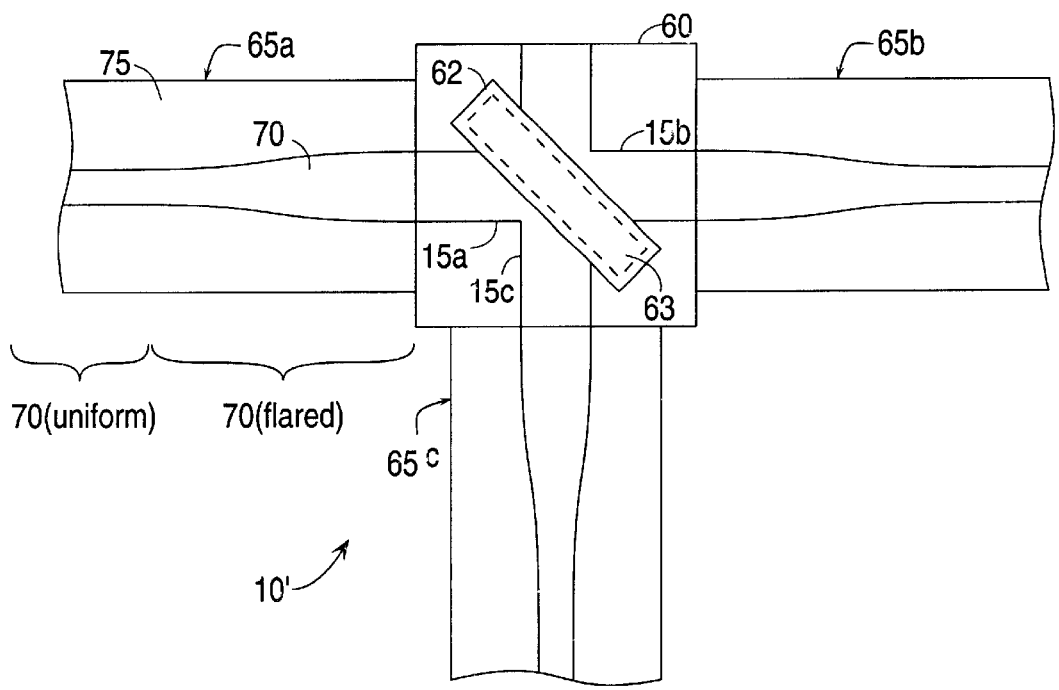
FIG. 5 is a schematic plan view of an embodiment using a flared-core fiber and a planar waveguide structure.

Basic Optical Routing Element (ORE) Architecture and Operation

FIG. 1 is a schematic plan view of an optical routing element (ORE) 10 according to a switch embodiment of the invention. ORE 10 includes collinear (extending along a common axis) first and second waveguide segments 15a and 15b, and a third waveguide 15c disposed at an angle to the first and second waveguide segments. For some applications, a fourth waveguide segment 15d, collinear with waveguide segment 15c, is desired.

A thermal expansion element (TEE) 20 is disposed between the first and second waveguide segments with the third waveguide segment on the same side of the TEE, and the second and fourth (if present) waveguide segments on the opposite side of the TEE. TEE 20 includes a body of material (shown with cross hatching) that has a contracted state at a first temperature T(low) and an expanded state at a second temperature T(high). When the TEE is in its contracted state, it defines an air gap 25 in the path of light traveling along first waveguide segment 15a. When the TEE is in its expanded state, it fills the air gap. The TEE material preferably has an index of refraction that matches the index of the waveguide segments.

A temperature control element 30 (having an associated temperature controller 35) is thermally coupled to TEE element 20 in order to control the state of the TEE. In most embodiments, the temperature control element is a resistive heater, so that the TEE is caused to switch from its contracted state to its expanded state by application of current to the heater. However, in other embodiments, the temperature control element could be a thermoelectric cooler element, so that the TEE is caused to switch from its expanded state to its contracted state by application of current to the cooler. It is also possible to provide a heater and a cooler for temperature control.

FIGS. 2A and 2B are schematics showing the operation of ORE 10. When the TEE is in its contracted state (FIG. 2A), it defines an air gap 25 in the path of light traveling along first waveguide segment 15a. This causes the light to undergo total internal reflection and pass into third waveguide segment 15c. When the TEE is in its expanded state (FIG. 2B), it fills the air gap, thereby allowing the light to pass into second waveguide segment 15b. Thus, the TEE provides the routing functionality, when suitably controlled by temperature controller 35.

The waveguide segments and TEE are shown as discrete elements, but the ORE is preferably fabricated as a monolithic planar waveguide structure, as will be described in greater detail below. Also, while the third waveguide segment is shown as being perpendicular (90°) to the first and second waveguide segments, other non-zero angles are possible. Indeed, as will be described below, it may be preferred in some embodiments that the third waveguide segment diverge from the common axis at a larger angle, say 120°.

Fabricating the Thermal Expansion Element (TEE)

FIGS. 3A–3C are schematic views showing a first technique for fabricating TEE 20. FIG. 3A shows a cavity 40 with surrounding structure 42 shown in phantom. In this technique, formable material (preferably a polymer) is introduced into cavity 40, allowed to set so that at temperature T(high) it fills the cavity and at temperature T(low) it contracts to define the air gap. A surface 45 of cavity 40 is coated or otherwise treated to minimize adhesion (i.e., is a non-stick surface), while the opposite surface is treated or configured to promote adhesion. As illustrated, the opposite surface may be formed with anchoring indentations to capture material introduced therein. FIG. 3B shows the cavity with a material 50 introduced so as to fill the cavity. FIG. 3C shows the result of lowering the temperature of the material and surrounding structure to a temperature at or below T(low) so that the material contracts, separating from surface 45, but adhering to the opposite surface. The separation from surface 45 provides gap 25.

FIGS. 4A–4D are schematic views showing a second technique for fabricating TEE 20. Primed reference numerals are used for elements corresponding to those in FIGS. 3A–3C. In this technique, an already formed material is used, as will now be described. As in the first technique, a cavity 40' has a non-stick surface 45' and an opposite surface that may be treated to promote adhesion. As shown in FIG. 4B, a preformed element 50' of resilient material is introduced into cavity 40'. Element 50' preferably has a plano-convex profile, and its flat surface is preferably coated with an adhesive layer 55. As an alternative or addition to non-stick surface 45', the curved surface of element 50' may be coated or treated to provide a non-stick surface. Element 50' is preferably chilled to a temperature below T(low) so that it is sufficiently contracted to ease insertion.

FIG. 4C shows the result of heating element 50' and the cavity structure to a temperature at or above T(high), so that the element expands to contact the opposite surfaces of the cavity. Note that TEE 20 extends transversely beyond the transverse extent of the waveguides, so in the expanded state, element 50' need only make optical contact with surface 45' over a central region having an area larger than the transverse area of the waveguide segment. It is preferred to heat the element sufficiently above T(high) to exert extra pressure on adhesive layer 55. FIG. 4D shows the result of lowering the temperature of element 50' and the surrounding structure to a temperature at or below T(low). At this temperature, element 50' contracts, with its flat surface remaining adhered to the cavity and its curved surface separated from cavity surface 45' to provide gap 25.

Planar Waveguide Configuration for Optical Routing Element (ORE)

FIG. 5 is a schematic plan view of an ORE 10' according to an alternative switch embodiment of the invention. In this embodiment, waveguide segments 15a–15c are defined by crossed planar waveguides (at the desired angle) formed in a planar waveguide structure 60. The planar waveguide structure can be manufactured in accordance with known technologies. For example, a typical construction has a layer of silicon dioxide (silica) formed on a silicon substrate. Regions of the silica corresponding to desired waveguides are doped to provide an increased refractive index relative to the remaining portions of the silica. This can be accomplished by known semiconductor processing techniques for creating buried structures.

A diagonal trench 62 is formed in the planar waveguide structure, and intersects the crossed waveguides where they intersect. A selectively reflecting element (shown schematically as a dashed rectangle 63) is disposed in the trench. As will be described below, the selectively reflecting element can be a thermal expansion element (TEE) such as TEE 20 described above, or it can have other functionality that causes light traveling along waveguide segment 15a to be selectively directed to waveguide segment 15b or 15c.

Light is communicated to and from waveguide segments 15a–15c via respective optical fibers 65a–65c. The drawing is also simplified in the sense that the mechanism for aligning the fiber ends to the ends of the waveguide segments is not shown. In a typical embodiment, the silicon substrate would extend outwardly beyond the outer periphery of the silica layer that includes the waveguide segments. V-grooves would be formed in the silicon substrate by lithographic processes that would align the grooves with the waveguide segments, and the fiber ends would be bonded into the V-grooves. This could be accomplished, for example, by metallizing the fibers and the V-grooves and soldering the metallized fibers in the metallized V-grooves.

According to a preferred configuration, these fibers have a special flared-core configuration as will now be described. The particular structure of fiber 65a will be described, it being understood that the other fibers preferably have corresponding structure. Fiber 65a, in accordance with known technology, has a central waveguiding core 70 surrounded by a lower-index-of-refraction cladding 75. The fiber has circular symmetry, with a typical core diameter for a single-mode fiber being about 10 μm. The core may have a refractive index that is constant across its diameter or it may have a graded index with, for example, a parabolic variation as a function of radial distance from the fiber axis (with the maximum index being along the axis).

However, in specific embodiments, the fiber is fabricated so that core 70 has a diameter that is uniform over a portion of its length, but which diameter gradually (adiabatically) expands or flares over a portion of its length so as to be at a larger diameter proximate and adjacent substrate 60. The uniform and flared portions of the core are designated 70(uniform) and 70(flared), respectively. The maximally expanded core diameter is typically a factor of 2–4 times the uniform normal core diameter. The maximally expanded diameter preferably matches the transverse dimension of the waveguides formed in substrate 60. A fiber segment with a flared core can be achieved by heating a portion of an optical fiber, which causes the dopants (e.g., germanium) that provide the increased index of refraction of the core to diffuse outwardly into the cladding.

The flaring of the core diameter is sufficiently gradual that the single-mode light propagation in the fiber remains single mode in the expanded core portion, and is single mode in the planar waveguide segments. This construction allows the waveguide segments to be wider, which allows a wider trench, which is advantageous for one or more reasons. A wider trench can ease some manufacturing tolerances and allow a thicker TEE. The thicker the body of thermal expansion material in the TEE, the lower the required temperature differential to provide a given thickness of air gap. The thicker the air gap, the lower the leakage of the evanescent wave. Thus, it is possible to achieve a desired low level of insertion loss and crosstalk with a more modest temperature differential. Further, the wider waveguide dimension can reduce or eliminate the need for collimators in the design.

It should be realized that while the use of the larger diameter relaxes the alignment tolerance in the x-y-z positioning of the fiber end with respect to the planar waveguide segment, the angular tolerance becomes more demanding. This can be addressed by aligning the fibers by bonding them into V-grooves formed on the surface of the silicon substrate as discussed above.

Figure 6:
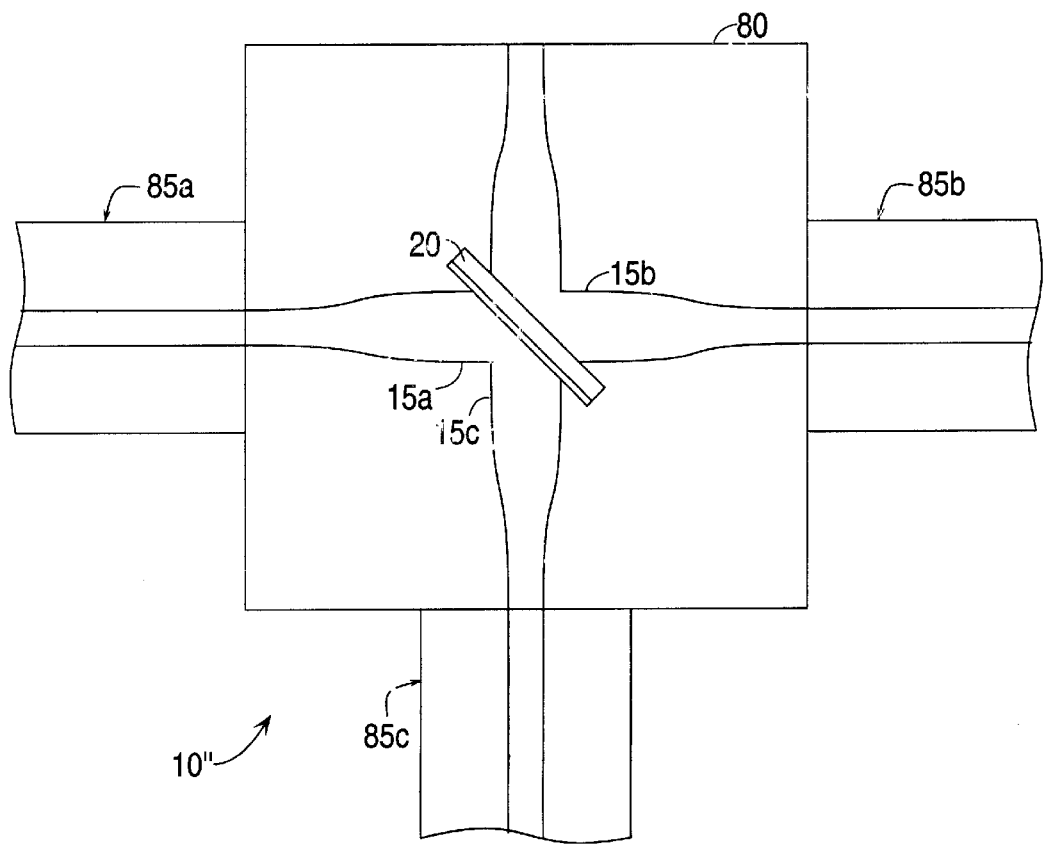
FIG. 6 is a schematic plan view of an embodiment of using fibers with fixed-diameter cores and flared waveguide segments in a planar waveguide structure.

FIG. 6 is a schematic plan view of an ORE 10" according to a further alternative embodiment. This embodiment, which has a TEE such as TEE 20, is similar to that shown in FIG. 5 in that waveguide segments 15a–15c are defined by crossed planar waveguides formed in a planar waveguide structure 80 with light being communicated to and from waveguide segments 15a–15c via respective optical fibers 85a–85c. This embodiment differs, however, in that the fibers are normal fibers with cylindrical cores, but the waveguide segments in the planar waveguide structure are flared so that their transverse dimension at the edge matches the diameter of the fiber core, while the transverse dimension in the intersection region is larger, say by a factor of 2–4.

Switch Arrays

Figure 7:
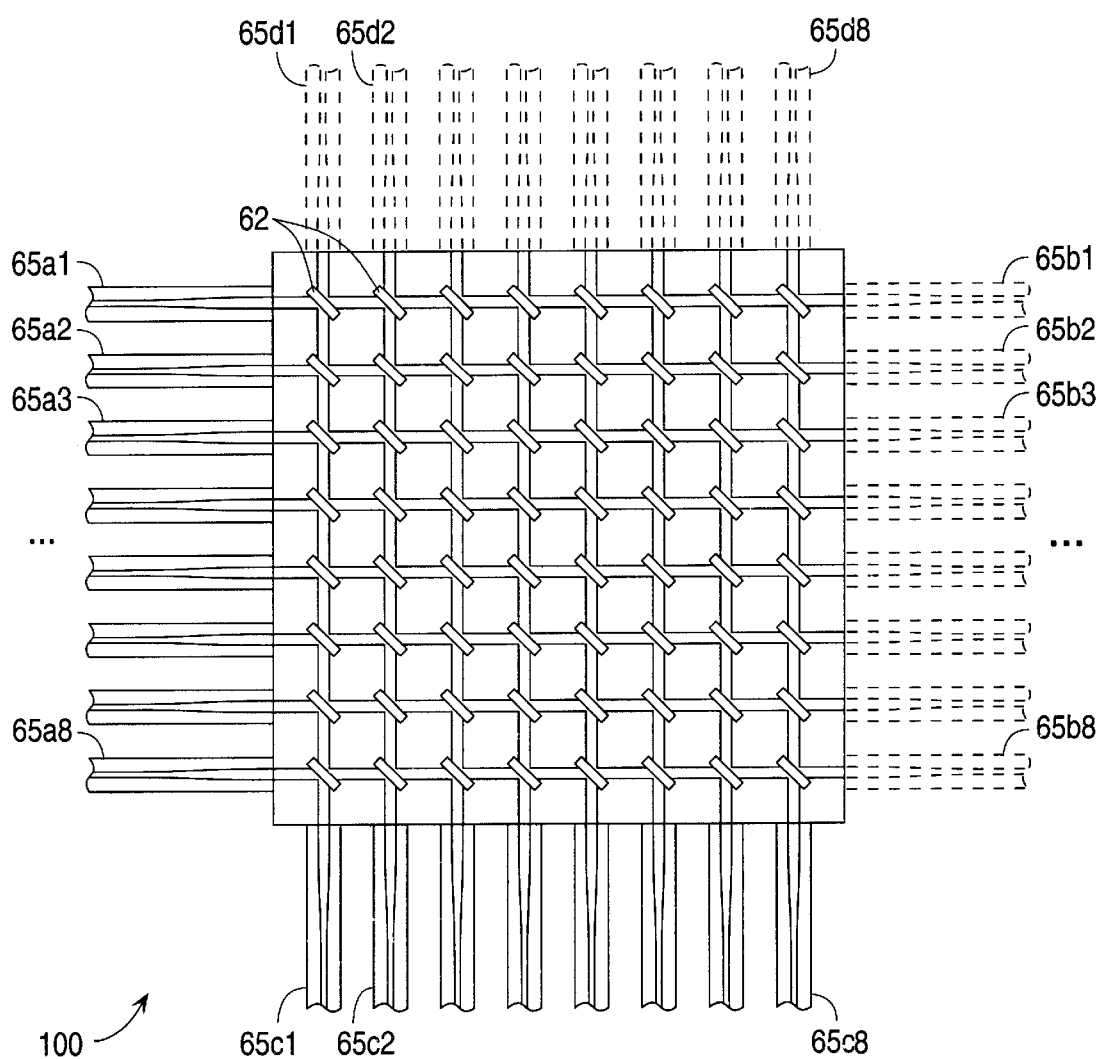
FIG. 7 is a schematic plan view of an 8×8 switch matrix.

The switch embodiments of the ORE described above find applicability in switch matrices (arrays), such as crossbar switches. FIG. 7 shows an 8×8 switch matrix 100, fabricated according to the techniques described above in connection with FIG. 5. Corresponding elements have corresponding reference numerals. However, note that each of flared-core fibers 65a, 65b, 65c, and 65d has eight counterparts, designated 65a1 . . . 65a8, 65b1 . . . 65b8, 65c1 . . . 65c8, and 65d1 . . . 65d8. Similarly trench 62 has 64 counterparts. Each trench has a respective TEE (or other selectively reflecting element), not explicitly shown due to the smaller scale of the drawing. This switch matrix can be controlled according to the desired application in the same manner as conventional switch matrices.

If the switch matrix is to be used as a crossbar switch, where the optical signals coming in from the left on fibers 65a1 . . . 65a8 are mapped to fibers 65c1 . . . 65c8 in a one-to-one manner (i.e., no through path), then fibers 65b1 . . . 65b8 and 65d 1. . . 65d8 are not needed. In recognition of this fact, fibers 65b1 . . . 65b8 are shown in phantom. However, in wavelength switching embodiments, to be described below, one or both of these sets may be needed.

It is noted that the ORE using a TEE is particularly well suited to deployment in a switch array. For example, consider the case when a given TEE is in its expanded state and the TEE above it is in its contracted state. The given TEE thus transmits light from left to right (in the plane of the drawing), while the TEE above the given TEE reflects light downwardly (in the plane of the drawing). This reflected light passes through the given TEE, which is in its expanded state, without interference. Thus the switch using the TEE is a non-blocking switch.

Other Selectively reflecting Elements

The trenched planar waveguide architecture discussed in connection with FIG. 5 can be used with other selectively reflecting elements, or in some cases even static elements to provide a variety of routing devices.

Figures 8A, 8B:
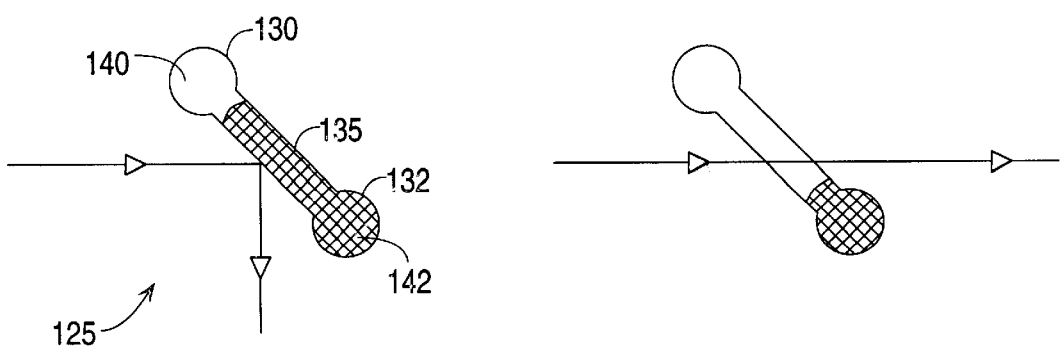
FIGS. 8A and 8B are schematic views showing a selectively reflecting element that uses mercury and an index matching fluid or gel to provide selective external reflection.

FIGS. 8A and 8B show a selectively reflecting element 125 that selectively moves mercury into the path of the light. For simplicity, the waveguide segments are not shown. Element 125 defines a chamber that includes first and second reservoir portions 130 and 132, separated by, and in communication with, a conduit 135. The conduit is interposed in the path of light for the selective reflection. The chamber contains a volume of an index matching gel or liquid 140 (referred to collectively as the gel) and a volume of mercury 142. FIG. 8A shows the situation when the mercury reservoir is heated and the gel reservoir is cooled. In this state, the mercury expands to fill a sufficient portion of the conduit so as to reflect light that impinges on element 125. FIG. 8B shows the situation when the gel reservoir is heated and the mercury reservoir is cooled. In this state, the gel expands to fill a sufficient portion of the conduit so as to transmit light that impinges on element 125. Conduit 135 is configured to present a planar face to oncoming light so that the reflection off the mercury is controlled and directs the light downwardly (in the plane of the drawing) into the third waveguide (in the terminology of FIGS. 1 and 2A–2B).

The need to simultaneously heat the mercury and cool the gel, or vice versa, arises from the desire to use an incompressible index matching gel and the desire to have a sealed chamber containing only mercury and gel. It is possible, however, to modify the heating regime so as to only require a single heater for the mercury, and possibly eliminate the need for any cooler. This can be accomplished by providing an additional volume of a compressible medium (e.g., air), which is not necessarily index matching, in reservoir 140 to allow the mercury to expand and contract, with the gel retaining a relatively constant volume.

Figure 9:
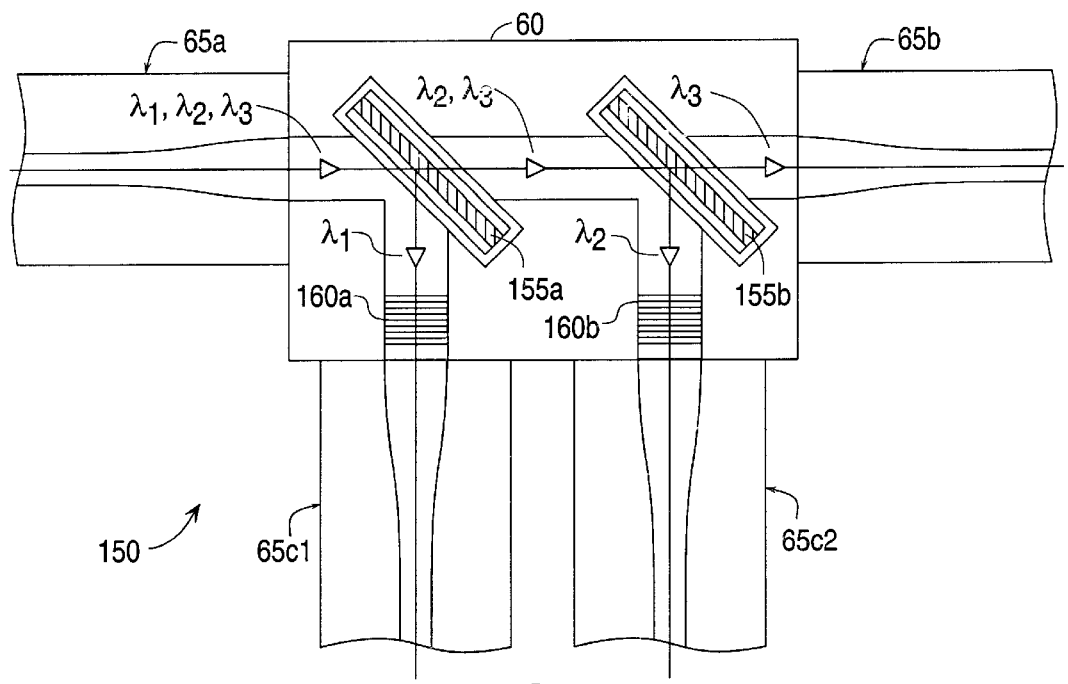
FIG. 9 is a schematic plan view showing the use of wavelength-selective filters as the selectively reflecting element to effect a wavelength multiplexing device.

FIG. 9 is a schematic plan view showing the use of wavelength-selective filters (e.g., interference filters or holographic filters) as the selectively reflecting elements to implement a wavelength division multiplexing/demultiplexing (WDM) device 150. The specific device shown includes two trenches formed in a planar waveguide structure 60 with one waveguide segment extending horizontally and two waveguide segments extending downwardly. The interface fibers are designated 65a, 65b, 65c1, and 65c2 in accordance with the previous numbering regime. Filters 155a and 155b are selected to have suitable passbands to provide operation as follows. Light including a plurality of wavelengths, including wavelengths designated $\lambda 1$, $\lambda 2$, and $\lambda 3$, is input from the left on fiber 65a. On encountering filter 155a, light of wavelength $\lambda 1$ is reflected downwardly and exits via fiber 65c1. The remaining light passes through filter 155a and encounters filter 155b, whereupon light of wavelength $\lambda 2$ is reflected downwardly and exits via fiber 65c2. The remaining light, including light of wavelength $\lambda 3$, passes through filter 155b, and exits via fiber 65b.

The drawing also shows Bragg gratings 160a and 160b formed in the vertical waveguide segments to enhance the waveguide selectivity of the device. While the drawing shows light of multiple wavelengths being separated into individual wavelengths and directed onto separate spatial channels (i.e., a wavelength demultiplexing operation), it should be recognized that WDM device 150 is reversible. The device can operate as a wavelength multiplexing device (wavelength combiner) by directing light of the individual wavelengths into fibers 65b, 65c1, and 65c2, with the combined light exiting via fiber 65a.

Figure 10A:
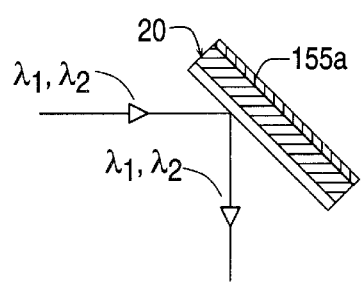
FIGS. 10A and 10B are schematic views showing the combination of a wavelength-selective filter and a TEE to effect wavelength switching.
Figure 10B:
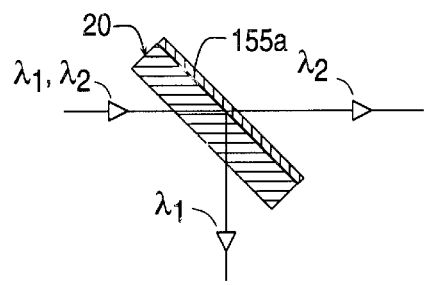

FIGS. 10A and 10B are schematic views showing how the combination of a wavelength-selective filter and a TEE can be used effect wavelength switching. The TEE is designated 20, which corresponds to the TEE in FIGS. 1, 2A, 2B, and 6, while the filter is designated 155a, which corresponds to filter 155a in FIG. 9. For simplicity, the waveguide segments are not shown. The drawings show light of wavelengths $\lambda 1$ and $\lambda 2$ incident from the left. FIG. 10A shows the TEE in its contracted state, whereupon all the incident wavelengths are reflected downwardly by total internal reflection at the air gap. Fig. 10B shows the TEE in its expanded state, whereupon all the incident wavelengths pass through the TEE and encounter filter 155a. The light at wavelength $\lambda 1$ is reflected downwardly by the filter, while the light at wavelength $\lambda 2$ passes through.

Figure 11A:
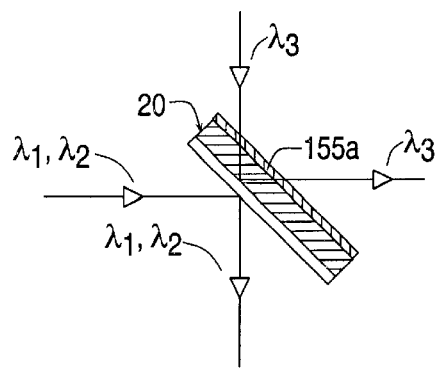
FIGS. 11A and 11B are schematic views showing the combination of a wavelength-selective filter and a TEE to effect a switched add/drop multiplexing function.
Figure 11B:
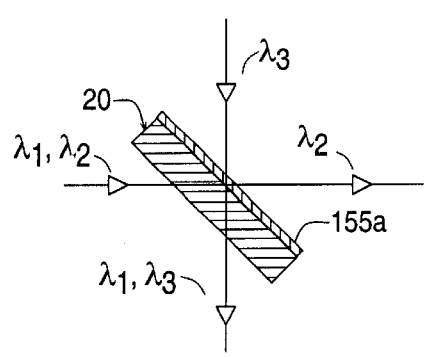

FIGS. 11A and 11B are schematic views showing how the above combination of a wavelength-selective filter and a TEE can be used to effect a switching add/drop multiplexing function. Again, for simplicity, the waveguide segments are not shown. The drawings show light of wavelengths $\lambda 1$ and $\lambda 2$ incident from the left and light of wavelength $\lambda 3$ incident from the top. As in the embodiments of FIGS. 9, 10A, and 10B, filter 155a is assumed to transmit light of wavelengths $\lambda 2$ and $\lambda 3$ while reflecting light of wavelength $\lambda 1$.

FIG. 11A shows TEE 20 in its contracted state so as to define an air gap, whereupon light at wavelengths $\lambda 1$ and $\lambda 2$ is reflected downwardly by total internal reflection at the air gap, while light at wavelength $\lambda 3$ passes downwardly through filter 155a and is reflected to the right by total internal reflection at the air gap. FIG. 11B shows the TEE in its expanded state so as to close the air gap, whereupon light at wavelengths $\lambda 1$ and $\lambda 2$ passes through TEE 20, light at wavelength $\lambda 1$ is reflected downwardly by the filter, light at wavelength $\lambda 2$ passes through the filter and continues to the right, and light at wavelength $\lambda 3$ passes downwardly through the filter and TEE 20.

Thus, with TEE 20 in the contracted state, light at wavelengths $\lambda 1$ and $\lambda 2$ remains together while light at wavelength $\lambda 3$ stays on a separate path. With TEE 20 in the expanded state, light at wavelengths $\lambda 2$ and $\lambda 3$ exchange paths.

In the embodiments described above, it was assumed that all the trenches in a multi-trench device were occupied by the same type or types of selectively reflecting element. This is not necessary. For example, at least some of the trenches could be occupied by interference filters and others by TEEs to combine bandpass filtering and switching in a single device.

Waveguide Intersection Angle Considerations

In the above discussion of the various switch embodiments, it was assumed that total internal reflection occurred at the air gap. As a practical matter, this will be true so long as the air gap is long enough. Indeed, one of the advantages of having the waveguide segments of increased dimension is that it allows a wider trench, so that the TEE material can expand and contract more for a given temperature differential. Following is a more detailed discussion of the mechanism of total internal reflection.

It is well known to those skilled in the art that light traveling in a medium having a given index of refraction will in general be partially reflected and partially transmitted when it encounters an interface with a medium having a different index of refraction. The relative amounts of reflected and transmitted light depend on the refractive indices of the media and the angle of incidence, which is normally measured from the normal (or perpendicular) to the interface.

It is also well known that light traveling in a medium having a given index of refraction will be totally internally reflected at an interface with a medium having a lower index of refraction if the light is incident at an angle that is larger than what is referred to as the critical angle. The critical angle depends on the indices of refraction in the two media.

It is also well known that total internal reflection is an idealization in the sense that the light traveling in the high-index medium actually penetrates beyond the interface with the low-index medium. This is referred to as the evanescent wave. If the low-index medium is a layer sandwiched between regions of high-index material, and if this layer is sufficiently thin, some of the light will actually pass through the layer of low-index material and enter the remote region of high-index material.

Figure 12:
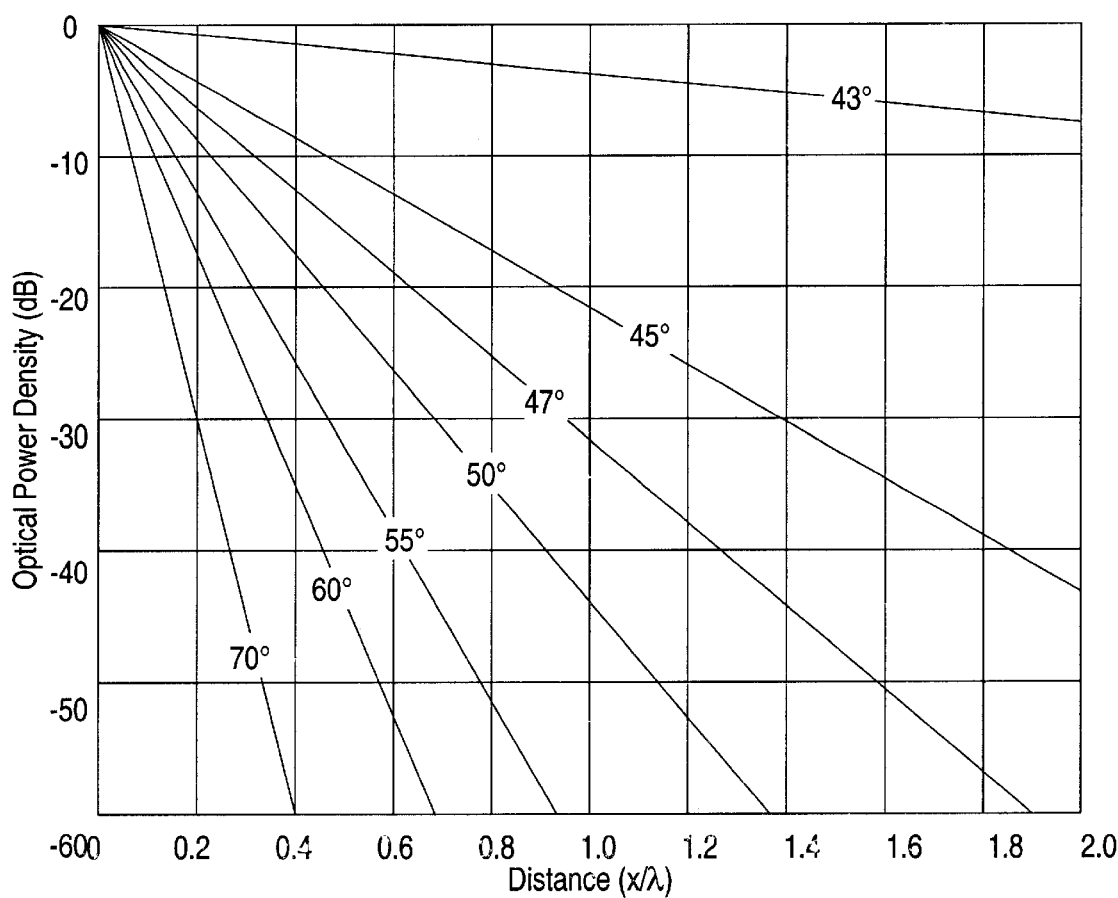
FIG. 12 is a graph showing the dependence of evanescent wave decay on incident angle.

FIG. 12 is a graph showing the dependence of evanescent wave decay on incident angle for the specific case of interest here, namely the preferred embodiment where the high-index medium is silica with a refractive index of 1.468 and the low-index medium is air or vacuum with a refractive index of 1. The graph shows the light power density (in dB) as a function of distance (normalized in units of the wavelength) for various angles of incidence. The figures illustrating the embodiments described above show an angle of incidence of 45°, which corresponds to the waveguide segments being perpendicular (90°) to each other. As can be seen in FIG. 12, the optical power density is only attenuated to −30 dB at a distance of 1.4 wavelengths from the interface. It is generally desired to have crosstalk below −50 db, which means that the air gap for the TEE needs to be more than 2.5 wavelengths (about 3.9 microns at a wavelength of 1550 nm). However, as can also be seen, the behavior is quite sensitive to incident angle, and at an incident angle of 60°, the air gap need only be about 0.6 wavelengths (less than a micron) for the attenuation to be at the −50 dB level.

Figure 13:
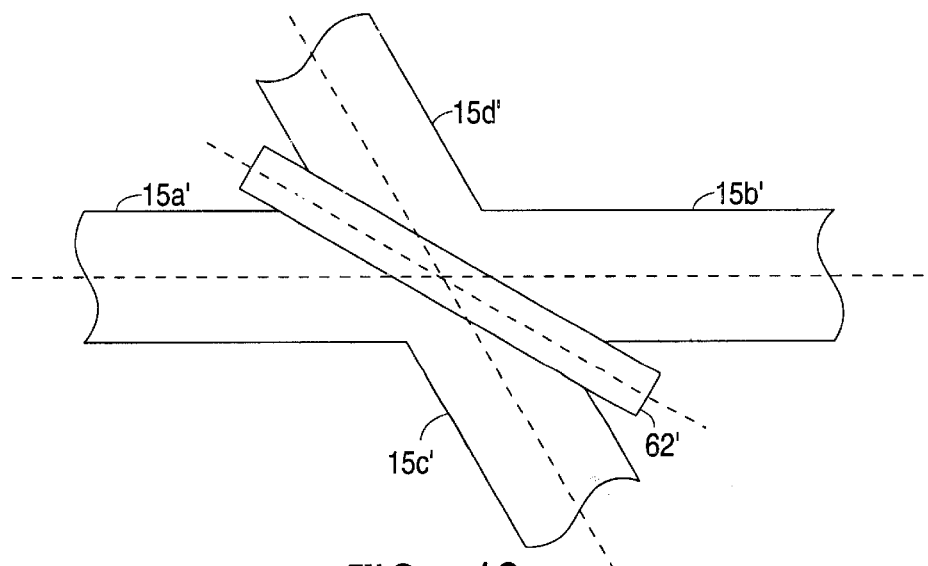
FIG. 13 is a schematic plan view of portions of an ORE where the waveguide segments intersect at an angle other than 90°.

FIG. 13 is a schematic plan view of portions of an ORE where the waveguide segments intersect with an included angle other than 90°. Only portions of the waveguide segments, designated 15a', 15b', 15c', and 15d', corresponding to waveguide segments 15a–15d in the other figures, are shown. In this embodiment the common axis of waveguide segments 15a' and 15b' intersects the common axis of waveguide segments 15c' and 15d' at an angle such that light traveling along waveguide segment 15a', when reflected into waveguide segment 15c', undergoes a 120° deflection. The axis of the trench, designated 62', intersects the common axis of waveguide segments 15a' and 15b' so as to bisect the angle between the waveguide segments. Thus light traveling along waveguide segment 15a' is at an incident angle of 60° from the normal to the axis of the trench (or the air gap surface when a TEE is in the trench).

Thermal Expansion Element (TEE) Material Considerations

Relevant physical properties for the TEE material include light transmission, refractive index, coefficient of thermal expansion, and glass transition temperature. Also to be considered are the changes of these properties with time or through repeated small cyclic deformations due to the thermal expansion and contraction that occur during operation of the routing element.

The material for the TEE is preferably a polymeric material, which is made up of large chain-like molecules. Polymers can be rubbery or glassy—the former are typically referred to as elastomers, the latter plastics. The properties are determined by the chemical composition of the links in the chain (monomers), the molecular architecture (i.e., the length of the chain, and the branching and network structure), and the solid state morphology (i.e., the way that the chains are arranged or packed together). These factors can be tailored to provide a high degree of flexibility in the design. That is, polymers can be designed to exhibit a wide range of properties by suitably varying these factors. Composition-property relationships are known for estimating the values for certain properties.

Regarding molecular architecture and solid state morphology, the material should be an elastic, transparent, isotropic solid that is easily and reversibly deformable. This is essentially the definition of a crosslinked elastomeric material (an elastomer being a very high molecular weight polymer with a glass transition temperature well below ambient temperature).

The refractive index depends very strongly on composition, and can be varied over a wide range from 1.35 to 1.6 or more. The glass transition temperature is also strongly dependent on composition. The linear coefficient of thermal expansion can be varied for elastomers over a range of $1.5$–$3.0 \times 10^{-4}/°C$. Generally, elastomers have higher thermal expansion coefficients than plastics (say on the order of a factor of 2), which is another reason that an elastomeric material is preferred. Absorbance should be low for most organic polymers, and can be minimized by choosing structures that do not have strong absorbance features in the near infrared.

While the refractive index of the TEE is less important when the TEE is in the contracted state (therefore defining the total internal reflection mode), it can be a concern when the TEE is in the expanded state. In this state, Fresnel reflections arising from an index mismatch could give rise to crosstalk since a small fraction of the light, all of which is nominally to be transmitted, could be reflected. Fortunately, the crosstalk is likely to be at a permissibly low level for realistic changes in refractive index. For example, for refractive index values ±0.002 from a nominal refractive index of 1.468, the crosstalk for an 8×8 switch array is −51 db and for a 16×16 switch array is −47.5 db. This stated mismatch of refractive index is larger than would be expected in typical situations, and so the crosstalk for actual embodiments is generally within a permissible range of values.

Achieving a desired refractive index for a polymer can be achieved by copolymerization. As is well known, the composition of a polymer can be varied by combining two or more different monomer units to form the polymer chain (i.e., copolymerization). For example, it is possible to make a silicone elastomer (polysiloxane) by combining dimethyl siloxane units (refractive index of 1.41) with methylphenysiloxane units (refractive index of 1.53) in the proper ration to obtain a copolymer with refractive index of 1.47 to match the refractive index of silica (the waveguide material). These components are commercially available and techniques for combining them are well known. A similar approach can be use to design acrylic or other families of polymers to achieve the desired refractive index.

Properties of elastomeric materials change with time primarily as a result of chemical changes induced by photolysis, oxidation, or hydrolysis. Since the material will generally not be exposed to ultraviolet radiation, oxygen, or moisture, this should not be a problem. Physical aging under mechanical stress, while possible since cyclical deformation could lead to fatigue (cracking) or compression set, is unlikely in view of the small deformations involved.

Conclusion

While the above is a complete description of specific embodiments of the invention, various modifications, alternative constructions, and equivalents may be used. For example, while elastomers and mercury/gel are candidates for the selectively reflecting element in switch embodiments, other materials can be used. Further, while the thermal management approaches described above contemplate individually controllable resistance heaters, individually controllable thermoelectric coolers, or a combination, there are other possibilities. One possibility for selective heating and/or cooling would be to provide a temperature controlled mass (e.g., a large heated or cooled plate) spaced from the planar waveguide structure, and have individually controllable pins that would provide a thermal path between individual TEE regions and the plate. The pins could be MEMS actuators.

Additionally, while silica waveguides are preferred since they match the refractive index of the glass fiber, waveguides made of glass or polymer are also suitable. As discussed above in connection with the material considerations for the TEE, polymers can be designed to have a desired refractive index. Thus, if it is desired to use polymer waveguides, they should be formed of a material whose index matches that of the fiber at the desired operating wavelengths.

Therefore, the above description should not be taken as limiting the scope of the invention as defined by the claims.

What is claimed is:

1. An optical routing element comprising:

first and second waveguide segments extending along a common axis, with a routing region disposed therebetween;

a third waveguide segment extending from said routing region along an axis that is at a non-zero angle with respect to said common axis;

a body of transparent solid material disposed in said routing region, said body having a contracted state at a first temperature and an expanded state at a second temperature, wherein said contracted state defines an air gap disposed in the path of light traveling along said first waveguide segment so as to cause said light to be deflected into said third waveguide segment through total internal reflection, and said expanded state removes said air gap disposed in the path of light traveling along said first waveguide segment so as to allow said light to pass into said second waveguide segment; and a wavelength-selective filter disposed in said routing region between said body and said second waveguide segment, said wavelength-selective filter reflecting light in a first wavelength range and transmitting light in a second wavelength range.

2. The optical routing element of claim 1, wherein said first, second, and third waveguide segments are formed in a monolithic planar waveguide device.

3. The optical routing element of claim 1, wherein said first, second, and third waveguide segments are segments of optical fiber.

4. The optical routing element of claim 1, wherein said transparent solid material is an elastomeric material.

5. The optical routing element of claim 1, and further comprising a heater controllable to elevate the temperature of said body to said second temperature.

6. The optical routing element of claim 1, wherein:

said first and second waveguide segments have respective first and second rigid faces adjacent said routing region; and said body contacts said first rigid face in said expanded configuration but not in said contracted configuration.

7. The optical routing element of claim 1, and further comprising a fourth waveguide segment extending along the same axis as said third waveguide segment, said fourth waveguide segment being separated from said third waveguide segment by said routing region.

8. An optical routing element comprising:

(a) a planar waveguide structure having edges, said planar waveguide structure including first and second waveguide segments extending along a common axis and disposed on opposite sides of a trench formed in said planar waveguide structure, said trench extending at a non-zero angle with respect to said common axis, and a third waveguide segment extending from said trench along an axis that is at a non-zero angle with respect to said common axis and with respect to said trench, said first, second, and third waveguide segments having a given width at respective positions at the edges of said planar waveguide structure;

(b) a body of transparent solid material disposed in said trench, said body having a contracted state at a first temperature and an expanded state at a second temperature, wherein said contracted state defines an air gap disposed in the path of said light traveling along said first waveguide segment so as to cause said light to be deflected into said third waveguide segment through total internal reflections, and said expanded state removes said air gap disposed in the path of light traveling along said first waveguide segment so as to allow said light to pass into said second waveguide segment;

(c) a wavelength-selective filter disposed in said trench between said body and said second waveguide segment, said wavelength-selective filter reflecting light in a first wavelength range and transmitting light in a second wavelength range; and (d) first, second, and third fibers in optical contact with said first, second, and third waveguide segments at said respective positions at the edges of said planar waveguide structure, each fiber having a core that flares to a maximum diameter where it contacts the respective waveguide segment, the maximum diameter being matched to said given width.

9. The optical routing element of claim 8 wherein:

said first and second waveguide segments have respective first and second rigid faces adjacent said trench; and said body contacts said first rigid face in said expanded configuration but not in said contracted configuration.

10. The optical routing element of claim 8, wherein said transparent solid material is an elastomeric material.

11. A switch matrix comprising:

a planar waveguide structure formed with first and second pluralities of waveguides wherein each waveguide in said first plurality intersects all waveguides in said second plurality to define a plurality of intersection points;

said planar waveguide structure being formed with trenches passing through said intersection points; and a plurality of bodies of transparent solid material disposed in said trenches, each body being disposed at a respective one of said plurality of intersection points, the body at the intersection of any given waveguide in said first plurality and any given waveguide in said second plurality having a contracted state at a first temperature and an expanded state at a second temperature, wherein said contracted state defines an air gap disposed in the path of light traveling along the given waveguide in said first plurality as to cause said light to be deflected into the given waveguide in the second plurality through total internal reflection, and said expanded state removes said air gap disposed in the path of light traveling along the given waveguide in said first plurality so as to allow said light to continue traveling along the given waveguide in said first plurality; and a wavelength-selective filter disposed in at least a given one of said trenches so as to intercept light traveling along a waveguide in said first plurality only after such light has passed through the body in the given trench, said wavelength-selective filter reflecting light in a first wavelength range and transmitting light in a second wavelength range.

12. The switch matrix of claim 11, and further comprising, for each body, at least one temperature control element controllable to cause the temperature of said body to reach a selected one of said first and second temperatures.

13. The switch matrix of claim 11, wherein the waveguides in said first plurality extend parallel to a first axis and the waveguides in said second plurality extend parallel to a second axis, with said first and second axes being non-parallel.

14. The switch matrix of claim 11, wherein:

there are as many discrete trenches as there are intersection points; and each trench passes through only one intersection point.

15. The switch matrix of claim 11, wherein:

the trench at the intersection of any given waveguide in said first plurality and any given waveguide in said second plurality has first and second rigid faces, the first face being the first encountered by light traveling along the given waveguide in said first plurality; and said body contacts said first rigid face in said expanded configuration but not in said contracted configuration.

16. The switch matrix of claim 11, wherein said transparent solid material is an elastomeric material.

17. A configurable wavelength multiplexing device comprising:

a planar waveguide structure formed with a first waveguide and a plurality of additional waveguides intersecting said first waveguide so as to define a plurality of intersection points;

said planar waveguide structure being formed with a plurality of trenches at respective intersection points;

a plurality of bodies of transparent solid material disposed in respective ones of said plurality of trenches, the body for the trench at the intersection point of said first waveguide and any given additional waveguide having a contracted state at a first temperature and an expanded state at a second temperature, wherein said contracted state defines an air gap disposed in the path of light traveling along said first waveguide as to cause said light to be deflected into the given additional waveguide through total internal reflections, and said expanded state removes said air gap disposed in the path of light traveling along said first waveguide so as to allow said light to continue traveling along said first waveguide; and a plurality of wavelength-selective filters associated with said plurality of bodies and being disposed in respective ones of said plurality of trenches, each wavelength-selective filter being disposed so as to intercept light traveling along said first waveguide only after such light has passed through the body associated with that wavelength-selective filter.

18. The device of claim 17, wherein:

at least one of said plurality of additional waveguides extends on both sides of said first waveguide.

19. The device of claim 17, and further comprising a plurality of Bragg gratings formed in respective ones of said additional waveguides to enhance waveguide selectivity of the device.

* * * * *